United States Patent [19]
Hwang

[11] Patent Number: 5,576,484
[45] Date of Patent: Nov. 19, 1996

[54] TIRE PRESSURE GAGE

[76] Inventor: Raymond Hwang, No. 35, Ding Tsao Road, Sec. 4, Tsao Chung Li, Lu Kang, Chang Hua Hsien, Taiwan

[21] Appl. No.: 542,923

[22] Filed: Oct. 13, 1995

[51] Int. Cl.$^6$ .................................................. B60C 23/02
[52] U.S. Cl. ...................................... 73/146.8; 73/146.3
[58] Field of Search .................................. 73/700, 146.2, 73/146.3, 146.8; 340/442, 443, 444, 445, 447

[56] References Cited

U.S. PATENT DOCUMENTS

| | | | |
|---|---|---|---|
| 1,494,001 | 5/1924 | McPherson | 73/146.8 |
| 3,131,667 | 5/1964 | Sajeck | 73/146.3 |
| 4,143,545 | 3/1979 | Sitabkhan | 73/146.8 |

*Primary Examiner*—Richard Chilcot
*Assistant Examiner*—William L. Oen
*Attorney, Agent, or Firm*—Fish & Richardson P.C.

[57] ABSTRACT

A tire pressure gage consisting of a detecting head, a cylindrical casing, an inner tube, and a pressure measuring scale, a pressure setting scale, an inner tube locating cap, a fine adjustment screw, a pressure spring, and a bottom cap, wherein the spring force of the pressure spring can be adjusted by the fine adjustment screw so that the pressure measuring scale can accurately indicate the tire pressure; the pressure setting scale can be set subject to the desired tire pressure so that the T-shaped piston can automatically open the longitudinal center through hole of the pressure measuring scale for permitting excessive tire pressure to be drawn away.

4 Claims, 2 Drawing Sheets

5,576,484

TIRE PRESSURE GAGE

BACKGROUND OF THE INVENTION

The present invention relates to tire pressure gages, and relates more particularly to such a tire pressure gage which detects and regulates the pressure of tires.

A variety of tire pressure indicators have been developed, and have appeared on the market. Exemplars of these tire pressure indicators are seen in U.S. Pat. No. 5,233,864, entitled "TIRE PRESSURE INDICATOR" which is incorporated with illuminating means; U.S. Pat. No. 5,289,161, entitled "TIRE PRESSURE INDICATOR" which has an alarm signal producing means that automatically gives an alarm signal when the pressure of the detected tire surpasses or drops below the predetermined value. These conventional tire pressure indicator means are functional, however they are used to indicate the pressure of the tire only, but cannot be used to regulate the pressure of the tire. If the pressure of the tire is detected higher than the predetermined value, the excessive pressure must be released from the tire. On the contrary, if the pressure of the tire is detected lower than the predetermined value, the tire must be inflated further. Several tests must be made to achieve the desired pressure.

SUMMARY OF THE INVENTION

The present invention has been accomplished to provide a tire pressure gage which detects the pressure of the tire and, which automatically releases the excessive pressure from the tire if the tire pressure surpasses the predetermined value.

According to the preferred embodiment of the present invention, the tire pressure gage comprises a cylindrical casing having a top end and a bottom end; a detecting head mounted on the top end of said cylindrical casing, having an air valve, a valve rod, and an air inlet; an inner tube mounted inside said cylindrical casing; a pressure measuring scale mounted inside said inner tube, said pressure measuring scale comprising an elongated scale body, a receptacle at a top end of said elongated scale body, a shoulder on said elongated scale body adjacent to said receptacle, a longitudinal center through hole at the center of said receptacle through the longitudinal central axis of said elongated scale body, a cushion mounted around said receptacle and supported on said shoulder; a T-shaped piston mounted in the longitudinal center through hole of said pressure measuring scale; a pressure setting scale slidably mounted inside said inner tube for setting the desired tire pressure value; an inner tube locating cap fastened to the bottom end of said cylindrical casing to hold said inner tube in place, having an inner thread and an outer thread; a fine adjustment screw threaded into the inner thread of said inner tube locating cap; a pressure spring supported between the shoulder of said pressure measuring scale and said fine adjustment screw, the spring force of said pressure spring being adjusted by said fine adjustment screw; and a bottom cap threaded onto the outer thread of said inner tube, having a lock means for locking said pressure setting scale in position. The pressure setting scale can be pulled out of the bottom cap at a certain distance subject to the desired tire pressure so that the T-shaped piston can automatically open the longitudinal center through hole of the pressure measuring scale for permitting excessive tire pressure to be drawn away.

DETAILED DESCRIPTION OF THE PREFERRED EMBODIMENT

Figure 1:
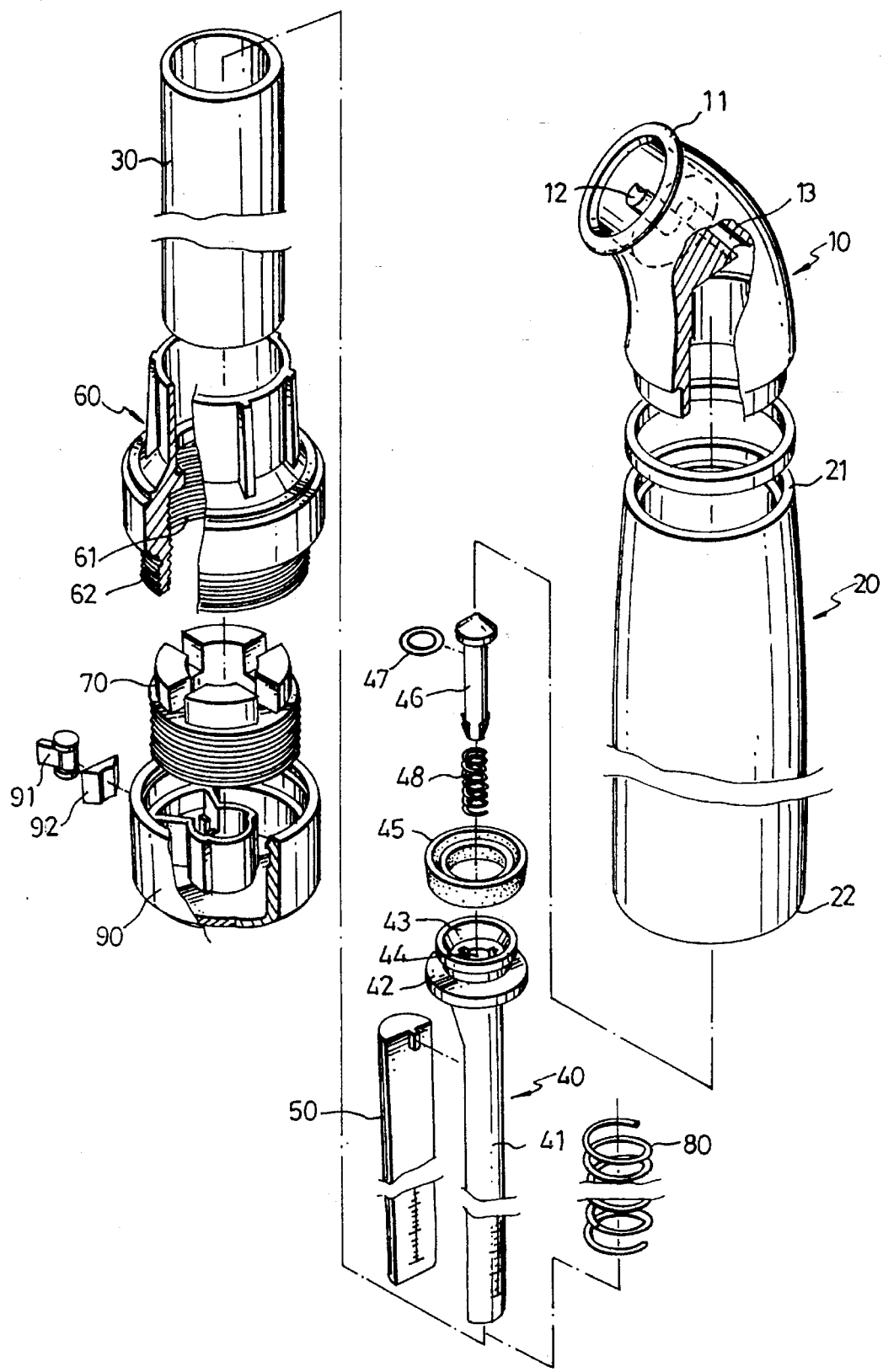
FIG. 1 is an exploded view of a tire pressure gage according to the present invention.
Figure 2:
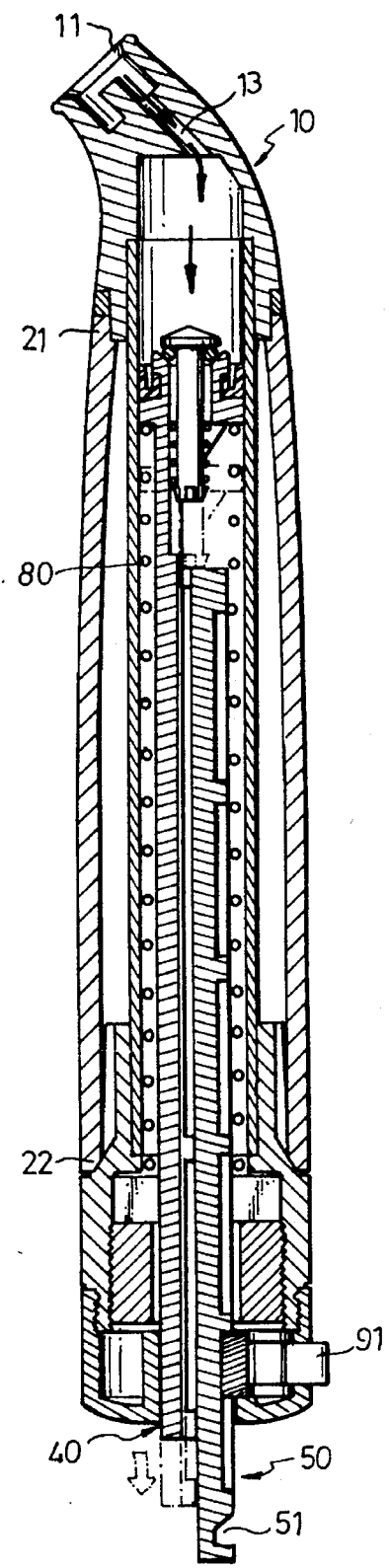
FIG. 2 is a longitudinal view in section of the tire pressure gage shown in FIG. 1, showing the relief port closed.

Referring to FIGS. 1 and 2, a tire pressure gage in accordance with the present invention is generally comprised of a detecting head 10, a cylindrical casing 20, an inner tube 30, and a pressure measuring scale 40, a pressure setting scale 50, a inner tube locating cap 60, a fine adjustment screw 70, a pressure spring 80, and a bottom cap 90. The detecting head 10 is mounted on the top end 21 of the cylindrical casing 20, having an air valve 11, a valve rod 12, and an air inlet 13. The pressure measuring scale 40 is mounted inside the inner tube 30, comprising an elongated scale body 41, a receptacle 43 at the top end of the elongated scale body 41, a shoulder 42 adjacent to the receptacle 43, a longitudinal center through hole 44 at the center of the receptacle 43, a cushion 45 mounted around the receptacle 43 and supported on the shoulder 42, a T-shaped piston 46 mounted in the longitudinal center through hole 44, a spring 48 mounted around the T-shaped piston 46 within the receptacle 43, and supported a rubber ring 47 mounted around the T-shaped piston 46. The pressure setting scale 50 is mounted inside the inner tube 30, having a bottom groove 51 disposed outside the bottom cap 90. The inner tube locating cap 60 is fastened to the bottom end 22 of the cylindrical casing 20 to hold the inner tube 30, having an inner thread 61 and an outer thread 62. The fine adjustment screw 70 is threaded into the inner thread 61 of the inner tube locating cap 60 and stopped against the pressure spring 80. The bottom cap 90 is threaded onto the outer thread 62 of the inner tube locating cap 60, having a lock means consisting of a locating knob 91 and a holding-down plate 92 for holding the pressure setting scale 50 in place.

Referring to FIG. 2 again, the pressure setting scale 50 is used to set the desired tire pressure by pulling it out of the bottom cap 90 to a certain distance subject to the desired tire pressure and then fixing it in place by the locating knob 91. When the detecting head 10 is connected to the tire, compressed air is guided from the tire through the air valve 11 and the air inlet 13 to force the pressure measuring scale 40 out of the bottom cap 90, and therefore the tire pressure of the tire is measured.

Figure 3:
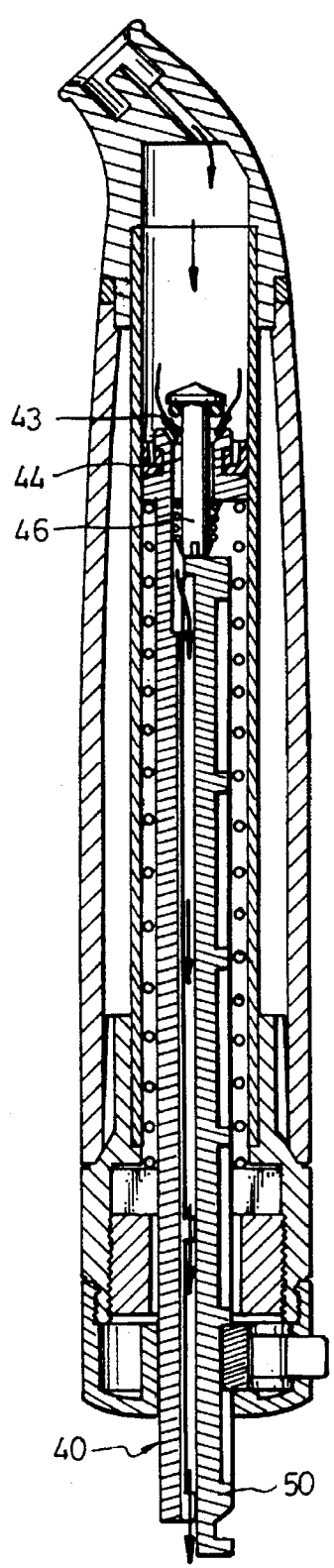
FIG. 3 is another longitudinal view in section of the tire pressure gage shown in FIG. 1, showing the relief port opened and tire air released from the relief port.

Referring to FIG. 3, when the tire pressure surpasses the desired value, the pressure measuring scale 40 is displaced at a distance over the extended distance of the pressure setting scale 50, the T-shaped piston 46 will be stopped at the pressure setting scale 50 to open the longitudinal center through hole 44 of the receptacle 43, and therefore excessive tire pressure is released through the longitudinal center through hole 44. When the tire pressure of the tire drops to the set value, the T-shaped piston 46 is returned to its former position to seal the longitudinal center through hole 44 again. Therefore, the tire pressure of the tire is automatically regulated to the desired value.

It is to be understood that the drawings are designed for purposes of illustration only, and are not intended as a definition of the limits and scope of the invention disclosed.

I claim:

1. A tire pressure gage comprising:

a cylindrical casing having a top end and a bottom end;

a detecting head mounted on the top end of said cylindrical casing, having an air valve, a valve rod, and an air inlet;

an inner tube mounted inside said cylindrical casing;

a pressure measuring scale mounted inside said inner tube, said pressure measuring scale comprising an elongated scale body, a receptacle at a top end of said elongated scale body, a shoulder on said elongated scale body adjacent to said receptacle, a longitudinal center through hole at the center of said receptacle through the longitudinal central axis of said elongated scale body, a cushion mounted around said receptacle and supported on said shoulder;

a T-shaped piston mounted in the longitudinal center through hole of said pressure measuring scale;

a pressure setting scale slidably mounted inside said inner tube for setting the desired tire pressure value;

an inner tube locating cap fastened to the bottom end of said cylindrical casing to hold said inner tube in place, having an inner thread and an outer thread;

a fine adjustment screw threaded into the inner thread of said inner tube locating cap;

a pressure spring supported between the shoulder of said pressure measuring scale and said fine adjustment screw, the spring force of said pressure spring being adjusted by said fine adjustment screw; and a bottom cap threaded onto the outer thread of said inner tube, having a lock means for locking said pressure setting scale in position, wherein said pressure setting scale can be set subject to the desired tire pressure so that said T-shaped piston can automatically open the longitudinal center through hole of said pressure measuring scale for permitting excessive tire pressure to be drawn away.

2. The tire pressure gage of claim 1 wherein said T-shaped piston is mounted with a rubber ring and supported on a spring inside the receptacle of said pressure setting scale.

3. The tire pressure gage of claim 1 wherein said lock means consists of a locating knob and a holding-down plate.

4. The tire pressure gage of claim 1 wherein said pressure setting scale has a bottom end made with a groove and disposed outside said bottom cap.

* * * * *